US012018184B2

(12) United States Patent
Muller et al.

(10) Patent No.: US 12,018,184 B2
(45) Date of Patent: Jun. 25, 2024

(54) CONTACT ADHESIVES

(71) Applicant: Synthomer Deutschland GmbH, Marl (DE)

(72) Inventors: Peter Muller, Marl (DE); Olaf Kopke, Marl (DE); Danny Antes, Marl (DE)

(73) Assignee: Synthomer Deutschland GmbH, Marl (DE)

( * ) Notice: Subject to any disclaimer, the term of this patent is extended or adjusted under 35 U.S.C. 154(b) by 660 days.

(21) Appl. No.: 17/276,321

(22) PCT Filed: Sep. 6, 2019

(86) PCT No.: PCT/EP2019/073790
§ 371 (c)(1),
(2) Date: Mar. 15, 2021

(87) PCT Pub. No.: WO2020/057999
PCT Pub. Date: Mar. 26, 2020

(65) Prior Publication Data
US 2022/0033692 A1 Feb. 3, 2022

(30) Foreign Application Priority Data
Sep. 21, 2018 (GB) .................................... 1815417

(51) Int. Cl.
| | | |
|---|---|---|
| C09J 133/12 | (2006.01) | |
| B32B 7/12 | (2006.01) | |
| B32B 9/02 | (2006.01) | |
| C09J 7/10 | (2018.01) | |
| C08F 220/18 | (2006.01) | |

(52) U.S. Cl.
CPC .............. *C09J 133/12* (2013.01); *B32B 7/12* (2013.01); *B32B 9/025* (2013.01); *C09J 7/10* (2018.01); *B32B 2437/02* (2013.01); *B32B 2479/00* (2013.01); *C08F 220/1804* (2020.02); *C08F 2438/02* (2013.01)

(58) Field of Classification Search
CPC ...... C09J 133/12; C09J 7/10; C08F 220/1804; C08F 2438/02; B32B 2479/00; B32B 9/025; B32B 2437/02; B32B 7/12
USPC ...................................................... 524/322
See application file for complete search history.

(56) References Cited

U.S. PATENT DOCUMENTS

| | | | |
|---|---|---|---|
| 3,919,451 A | * | 11/1975 | Levy .................... C14C 11/003 427/415 |
| 4,267,091 A | | 5/1981 | Geelhaar et al. |
| 4,529,772 A | | 7/1985 | Druschke et al. |
| 4,948,822 A | | 8/1990 | Iovine et al. |
| 5,543,455 A | | 8/1996 | Shah |
| 2017/0267901 A1 | | 9/2017 | Qie et al. |
| 2019/0016931 A1 | | 1/2019 | Schumacher et al. |

FOREIGN PATENT DOCUMENTS

| | | |
|---|---|---|
| CN | 104804125 A | 7/2015 |
| CN | 108473820 A1 | 8/2018 |
| EP | 2246403 A1 | 11/2010 |
| EP | 2831189 B1 | 5/2017 |
| GB | 1465618 A | 2/1977 |
| JP | 2004339424 A | 12/2004 |
| JP | 4245977 B2 | 4/2009 |
| JP | 2009-269972 A | 11/2009 |
| JP | 2011-219656 A | 11/2011 |
| WO | 2017/160398 A1 | 9/2017 |

OTHER PUBLICATIONS

Zhang, et al., "The Diacetone Acrylamide Crosslinking Reaction and Its Control of Core-Shell Polyacrylate Latices at Ambient Temperature" Journal of Applied Science, vol. 123, No. 3, 2012, p. 1822-1832.
International Search Report and Written Opinion dated Nov. 15, 2019 for corresponding PCT/EP2019/073709 (12 pps).
Koukiotis et al. "Synthesis and Characterization of Latexes Based on Copolymers BA/MMA/DAAM and BA/MMA/VEOVA-10/ DAAM and the Corresponding 1K Crosslinkable Binder Using the Adipic Acid Dihydrazide as Crosslinking Agent" Progress in Organic Coatings, Elsevier BV, NL, vol. 69, No. 4; Dec. 1, 2010, pp. 504-509.

* cited by examiner

*Primary Examiner* — Hui H Chin
(74) *Attorney, Agent, or Firm* — Renner, Kenner; Arthur M. Reginelli

(57) ABSTRACT

The present invention relates to a polymer latex composition, a method to prepare polymer latex compositions and an article comprising said polymer latex compositions. In particular but not exclusively, the invention relates also to a one-part aqueous contact adhesive comprising said polymer latex compositions. Furthermore, the present invention refers to a method to coagulate said polymer latex compositions.

15 Claims, No Drawings

CONTACT ADHESIVES

FIELD OF THE INVENTION

The present invention relates to a polymer latex composition, a method to prepare polymer latex compositions and an article comprising said polymer latex compositions. In particular but not exclusively, the invention relates also to a one-part aqueous contact adhesive comprising said polymer latex compositions. Furthermore, the present invention refers to a method to coagulate said polymer latex compositions.

BACKGROUND OF THE INVENTION

In the past decade, environmental considerations have forced reevaluation of many established products. Contact adhesives based on elastomeric polymers, which have been available commercially for several decades, fall into this category.

As used herein, the term "contact adhesive" refers to an adhesive which is typically applied to one or more surfaces, typically two surfaces to be adhered together. The adhesive is allowed some dry time to form clear adhesive layer(s) and brought into contact with pressure so as to form a fast acting, if not an immediate, durable bond. Once the contact adhesives have been pressed together, the adhered pieces are ready for further processing, e.g. cutting. Contact adhesives are formulated so that no adhesive curing is required to achieve the desired adhesion.

Some contact adhesives are able to provide adhered substrates that exhibit handling strength within approximately 20 sec to 5 min after application to the substrate. A bond of sufficient strength is created to hold the substrates together and resist subsequent forces on the fresh adhesion area which might cause failure. Adhesives that provide such handling strength soon after application and adhering are typically referred to as "fast-setting" adhesives.

Most contact adhesives, heretofore, have been one-part contact adhesives based on chloroprene polymers. Such one-part contact adhesives (1-K) are conveniently able to be applied using a single source (i.e., container). Chloroprene-based adhesives are generally considered to have rapid bond strength development, good tack, self-adhesive properties with excellent heat, water and chemical resistance properties. The contact adhesive based on chloroprene polymers is typically only stable at basic pH (i.e., at least 8), since they would otherwise coagulate. Chloroprene is volatile, easily flammable, and halogen-containing and is considered hazardous to health and the environment. The polymerization product of chloroprene can further cause allergic reactions. Moreover, the production of chloroprene is significant resulting in increased cost for the production of contact adhesives based on chloroprene polymers.

Therefore, there is a strong need to develop alternative contact adhesives, which exhibit ease of formulation, as well as rapid bond strength development, good tack, self-adhesive properties with excellent heat, water and chemical resistance properties and have properties that are as good as or better than those of contact adhesives based on chloroprene polymers. Having formulations that have properties that are similar to those of contact adhesives based on chloroprene polymers are advantageous for the user/consumer, since little has to be changed in the end application.

U.S. Pat. No. 5,543,455 describes a waterborne adhesive comprising of an emulsified acrylic polymer, said acrylic polymer having an acid number of between 5 to 50, and an N-methylol acrylamide content of between 0.5 to 5 wt.-% based on monomer solids of said acrylic polymer. It is further disclosed that the waterborne adhesive also comprises a latex of an elastomer, e.g., rubber latexes such as natural rubber, neoprene, etc.; and anionic surfactant in amount sufficient to stabilize the aqueous dispersion. It is disclosed that N-methylol acrylamide is an essential monomer and that the elastomer latex is necessary for good bonding since the emulsified acrylic polymer does not give good bonding as a latex adhesive.

EP 2 246 403 A1 describes a water-borne, floor or contact adhesive formulation comprising a cross-linkable binder resin having a glass transition temperature (Tg) of less than 10° C., wherein the volatile organic compound (VOC) level of said formulation is less than 0.5 wt.-%. The cross-linkable binder should preferably have carbonyl functionalities. It is further disclosed that the formulation may optionally comprise a crosslinking agent. It is described that the glue-lines of the adhesive formulation needed to be allowed to dry for a relatively long period of time (15 to 60 min) before adhering of two substrates could be achieved.

U.S. Pat. No. 4,948,822 discloses a laminating adhesive in aqueous solution form comprising a core-shell polymer in aqueous emulsion form. The adhesive composition is based on an acrylic copolymer comprising a core and a shell in which a latently reactive, functional comonomer, e.g., glycidyl methacrylate, is placed in the core and a second functional comonomer reactive with the first comonomer is placed in the shell. It is further stated that the core-shell polymer has a Tg of −10° C. to −35° C. The weight ratio of core to shell monomers employed in preparing the polymer is stated to be in the range from about 2:1 to 5:1. Typically, the adhesive is coated on a film and allowed to dry at room temperature (or dried at moderate heat). The adhesive coated film is then laminated to a desired substrate by passing through a "hot nip" roller and hence the production time is high.

EP 2 831 189 B1 relates to a fast-setting, one-part, aqueous adhesive in the form of an emulsion comprising a core-shell polymeric component and a polyfunctional component capable of reacting with at least one of the pendent functional groups on the outer shell. It is described that the core-shell polymeric component comprises an inner core comprising a (meth)acrylate copolymer having a first glass transition temperature, and an outer shell comprising a (meth)acrylate copolymer containing at least one pendent functional group and having a second glass transition temperature which is less than, or equal to, the first glass transition temperature. The adhesive emulsions are disclosed to have a pH of 6.5 or less. It is not possible to achieve sufficient handling strength.

The prior art does not provide an aqueous-based, preferably a one-part/pack adhesive that can be free of various additives such as coagulants and free of halogenated polymers such as chloroprene polymers and still obtain superior behavior with respect to rapid bond strength development, high initial tack, excellent creep and heat resistance.

The object of the present invention is therefore to provide a polymer latex composition suitable for waterborne contact adhesives that is storage stable, yet provides rapid bond strength development and has high initial tack. Accordingly, it is also desirable to provide polymer latex compositions used typically as a one-part aqueous contact adhesive which is free of halogenated polymers such as polychloroprene, that can be applied to either one or both substrates to be bonded and that provides bonded substrates that initially can be repositioned. Moreover, it is desirable to provide polymer latex composition that can be coagulated in a controlled way.

SUMMARY OF THE INVENTION

This object has surprisingly been attained by a polymer latex composition comprising:
(I) the reaction product obtained by free-radical emulsion polymerization in aqueous medium conducted at a pH of 7.5 or higher of a monomer mixture comprising:
 (a) at least one alkyl (meth)acrylate,
 (b) at least one ethylenically unsaturated compound comprising at least one additional functional group, the at least one additional functional group being different than the ethylenically unsaturated group; and
 (c) optionally at least one polyethylenically unsaturated compound;
wherein the monomer mixture does not comprise any ethylenically unsaturated acids; and
in the presence of
 (d) a surfactant system comprising anionic surfactants comprising an alkyl carboxylic acid salt,
(II) a compound which is not polymerizable by free-radical polymerization and which comprises at least 2 functional groups capable of reacting with the at least one additional functional group of (b).

It has surprisingly been found that the polymer latex composition of the present invention provides a dispersion system which is sufficiently stabilized to ensure good storage stability while being easily destabilized to achieve controlled coagulation of the system. Herein, the term "storage stability" refers to polymer latex compositions which are able to provide consistent properties and performance even after storage at 25° C. for 180 days. The inventive polymer latex composition allows for a formulation without the incorporation of halogen-containing monomers. The polymer latex composition is fast-setting and has a high initial tack, but simultaneously provides the possibility to reposition bonded substrates. Moreover, the polymer latex composition is similar to well-established chloroprene-based adhesives, which makes it possible to combine both adhesive systems, if desired or needed. The inventive polymer latex composition offers a wide range of applications, as the flexible and simple system enables easy coagulation. Advantageously, coagulation can be achieved by applying shear forces to the polymer latex composition without the need of any chemical coagulant. This allows the use of the polymer latex composition in a number of products with reduced environmental impact.

Furthermore, the present invention relates to a method for the preparation of the polymer latex composition of the present invention, wherein (I) a monomer mixture is polymerized by free-radical emulsion polymerization in aqueous medium at a pH of 7.5 or higher in the presence of (d) a surfactant system comprising anionic surfactants comprising an alkyl carboxylic acid salt. The monomer mixture of the present invention comprises (a) at least one alkyl (meth) acrylate, (b) at least one ethylenically unsaturated compound comprising at least one additional functional group, the at least one additional functional group being different than the ethylenically unsaturated group; and (c) optionally at least one polyethylenically unsaturated compound. The monomer mixture of the present invention does not comprise any ethylenically unsaturated acids. The method for preparing the polymer latex composition of the present invention further comprises (II) the addition of a compound which is not polymerizable by free-radical polymerization and which comprises at least 2 functional groups capable of reacting with the at least one additional functional group of (b) to the polymer latex composition before or after the free-radical emulsion polymerization.

The present invention also relates to a one-part aqueous contact adhesive comprising the polymer latex composition of the present invention and accordingly to a method to coagulate the polymer latex composition of the present invention by applying shear forces, preferably by spraying.

Furthermore, the present invention relates to an article comprising at least two substrates adhered together with the polymer latex composition of the present invention.

Aspects of the Invention

1. A polymer latex composition comprising:
(I) the reaction product obtained by free-radical emulsion polymerization in aqueous medium conducted at a pH of 7.5 or higher of a monomer mixture comprising:
 (a) at least one alkyl (meth)acrylate,
 (b) at least one ethylenically unsaturated compound comprising at least one additional functional group, the at least one additional functional group being different than the ethylenically unsaturated group; and
 (c) optionally at least one polyethylenically unsaturated compound;
wherein the monomer mixture does not comprise any ethylenically unsaturated acids; and
in the presence of
 (d) a surfactant system comprising anionic surfactants comprising an alkyl carboxylic acid salt,
(II) a compound which is not polymerizable by free-radical polymerization and which comprises at least 2 functional groups capable of reacting with the at least one additional functional group of (b).

2. The polymer latex composition of aspect 1, wherein the monomer mixture comprises:
 (a) 80 to 99.5 wt.-% of alkyl (meth)acrylates;
 (b) 0.5 to 10 wt.-% of ethylenically unsaturated compounds comprising at least one additional functional group, wherein the at least one additional functional group is different than the ethylenically unsaturated group; and
 (c) 0 to 10 wt.-% of polyethylenically unsaturated compounds;
 the weight percentages being based on the total amount of monomers.

3. The polymer latex composition of any one of the preceding aspects, wherein the reaction mixture (I) comprises:
 0.3 to 5 wt.-% of anionic surfactants comprising a carboxylic acid salt, the weight percentages being based on the total amount of monomers.

4. The polymer latex composition of any one of the preceding aspects, wherein the surfactant system (d) consists of anionic surfactants comprising an alkyl carboxylic acid salt and optionally non-ionic surfactants, whereby the ratio of the anionic surfactants and the non-ionic surfactants if present is in the range of 1:0.2 to 1:0.01, more preferably 1:0.15 to 1:0.05, most preferably 1:0.10 to 0.07.

5. The polymer latex composition of any one of the preceding aspects, wherein the polymer latex composition comprises:
(II) 0.1 to 5 wt.-% of a compound which is not polymerizable by radical polymerization and which comprises at least 2 functional groups capable of reacting with the at least one additional functional group of (b), the weight percentages being based on the total amount of monomers.

6. The polymer latex composition of any one of the preceding aspects, wherein the pH of the polymer latex composition is in the range of 9 to 13, preferably 10 to 11.4.

7. The polymer latex composition of any one of the preceding aspects, wherein the alkyl carboxylic acid salt (d) is selected from the group consisting of alkali metal salts, ammonium salts, and tertiary amino salts of fatty acid, rosinic acid, hydroxyalkanoic acid, epoxyalkanoic acid, cyanoalkanoic acid, diterpene carboxylic acid, and the disproportionation, partial hydrogenation and polymerization products of diterpene carboxylic acid preferably selected from the group consisting of alkali metal salts, ammonium salts, and tertiary amino salts of oleates or of elaidic acid, stearates, myristate, palmitate, laurate, undecanate, linolate, caprylate, nonanate, caprinate, tall oil, diterpene carboxylic acid obtained from tall oil, pine resin and root resin and its disproportionation, partial hydrogenation and polymerization products;

more preferably selected from the group consisting of sodium oleate, potassium oleate, ammonium oleate, sodium stearate, potassium stearate, sodium myristate, potassium myristate, sodium palmitate, potassium palmitate, potassium laurate, potassium undecanate, sodium linolate, potassium linolate, potassium caprylate, potassium nonanate, potassium caprinate, and disproportionating potassium rosinate.

8. The polymer latex composition of any one of the preceding aspects, wherein the at least one alkyl (meth)acrylate (a) is selected from the group consisting of methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, 2-ethylhexyl (meth)acrylate, heptyl (meth)acrylate, 2-propylheptyl (meth)acrylate, n-octyl (meth)acrylate, iso-octyl (meth)acrylate, nonyl (meth)acrylate, decyl (meth)acrylate, iso-decyl (meth)acrylate, undecyl (meth)acrylate, dodecyl (meth)acrylate, tridecyl (meth)acrylate, heptadecyl (meth)acrylate, lauryl (meth)acrylate, stearyl (meth)acrylate, norbornyl (meth)acrylate, iso-bornyl (meth)acrylate, 4-t-butylcyclohexyl (meth)acrylate, and 3,3,5-trimethylcyclohexyl (meth)acrylate.

9. The polymer latex composition of any one of the preceding aspects, wherein the additional functional group of (b) is selected from hydroxyl, epoxy, glycidyl, ketone, aldehyde and acetoacetate groups, preferably ketone and aldehyde groups.

10. The polymer latex composition of any one of the preceding aspects, wherein the at least one ethylenically unsaturated compound (b) is selected from the group consisting of hydroxyethyl (meth)acrylate, hydroxypropyl (meth)acrylate, hydroxybutyl (meth)acrylate, hydroxyethyl caprolactone acrylate, glycidyl (meth)acrylate, acrolein, methacrolein, vinyl methyl ketone, vinyl ethyl ketone, vinyl isobutyl ketone, vinyl amyl ketone, diacetone acrylamide, and 2-[(2-methyl-1-oxo-2-propenyl)oxy]ethyl 3-oxobutanoate.

11. The polymer latex composition of any one of the preceding aspects, wherein the polyethylenically unsaturated compound (c) is selected from the group consisting of (meth)acrylic ester of polyole, allyl ester of polycarboxylic acid, allyl (meth)acrylate, and divinyl benzene.

12. The polymer latex composition of any one of the preceding aspects, wherein the functional group of (II) is selected from hydrazide, oxime ether, hydroxylamine and amine groups.

13. The polymer latex composition of any one of the preceding aspects, wherein the compound which is not polymerizable by free-radical polymerization (II) is selected from the group consisting of adipic dihydrazide, oxalic acid dihydrazide, ethylmalonic acid dihydrazide, succinic acid dihydrazide, glutaric acid dihydrazide, tartaric acid dihydrazide, pimelic acid dihydrazide, 9,10-dihydro-9,10-ethanoanthracene-11,12-dicarboxylic acid dihydrazide, valine dihydrazide, orthophtalic acid dihydrazide, isophthalic acid dihydrazide, terephthalic acid dihydrazide, sebacic acid dihydrazide, malonic acid dihydrazide, maleic acid dihydrazide, fumaric acid dihydrazide, itaconic acid dihydrazide, ethylene diamine, diethylenetriamine, triethylenetetramine, 1,2-propylene diamine, 1,3-propylene diamine, pentamethylene diamine, xylylene diamine, cyclohexane diamine and 1,6-hexanediamine.

14. The polymer latex composition of any one of the preceding aspects, wherein the reaction product has a glass transition temperature Tg of −10° C. or less determined by Dynamic Scanning calorimetry (DSC).

15. The polymer latex composition of any one of the preceding aspects, wherein the reaction product has an intensity weighted mean particle diameter (z-average) of 200 to 400 nm, preferably of 220 to 350 nm measured by a Dynamic Light Scattering (DLS).

16. The polymer latex composition of any one of the preceding aspects, wherein the solid content of the polymer latex composition is in the range of 45 to 65 wt.-%.

17. The polymer latex composition of any one of the preceding aspects, wherein the viscosity of the polymer latex is 1000 mPas or less determined as defined in the specification.

18. A one-part aqueous contact adhesive comprising the polymer latex composition of any one of the preceding aspects.

19. A method to coagulate the polymer latex composition of any one of the preceding aspects by applying shear forces, preferably by spraying.

20. A method to prepare a polymer latex composition, wherein (I) a monomer mixture comprising:
  (a) at least one alkyl (meth)acrylate,
  (b) at least one ethylenically unsaturated compound comprising at least one additional functional group, the at least one additional functional group being different than the ethylenically unsaturated group; and
  (c) optionally at least one polyethylenically unsaturated compound,
wherein the monomer mixture does not comprise any ethylenically unsaturated acids and is polymerized by free-radical emulsion polymerization in aqueous medium at a pH of 7.5 or higher in the presence of
  (d) a surfactant system comprising anionic surfactants comprising an alkyl carboxylic acid salt,
(II) a compound which is not polymerizable by free-radical polymerization and which comprises at least 2 functional groups capable of reacting with the at least one additional functional group of (b) is added to the polymer latex composition before or after the free-radical emulsion polymerization.

21. The method of aspect 20, wherein
(I) (a) is defined as in aspect 8; and/or
  (b) is defined as in aspects 9 or 10; and/or
  (c) is defined as in aspect 11; and/or
  (d) is defined as in aspect 7; and/or
(II) is defined as in aspects 12 or 13.

22. An article comprising at least two substrates adhered together with the polymer latex composition of any of aspects 1 to 17.

23. The article of aspect 22, wherein the two substrates adhered together are the same or different from each other.

24. The article of aspects 22 or 23, wherein the substrates can be selected from the group consisting of wood; metal; fabric; paper; leather; artificial leather; foam; thermoplastic; elastomer; concrete; rock; glass; ceramics; fiberglass; and materials used to construct high pressure laminates, preferably the substrates can be selected from the group consisting of wood, metal, leather, artificial leather, foam, thermoplastic and elastomer.

25. The article of aspect 24, wherein the metal is selected from the group consisting of cold-rolled steel, galvanized steel and aluminum; and/or the foam is selected from the group consisting of polyurethane (PU) foams, polyethylene (PE) foams, latex rubber foams, and ethylene-vinyl acetate (EVA) foams; and/or the thermoplastic is selected from the group consisting of acrylic polymers, polylactic acids, polyamides, polybenzimidazoles, polycarbonates, polyether sulfones, polyoxymethylenes, polyetherether ketones, polyetherimides, polyethylenes, polyphenylene oxides, polyphenylene sulfides, polypropylenes, polystyrenes, polyvinyl chlorides, polytetrafluoroethylenes, and acrylonitrile butadiene styrene; and/or the elastomer is selected from the group consisting of polyisoprenes, polybutadienes, butyl rubber, styrene-butadiene rubbers, nitrile rubbers, ethylene propylene rubbers, ethylene propylene diene rubbers, epichlorohydrin rubbers, polyacrylic rubbers, silicone rubbers, fluorosilicone rubbers, polyether block amides, chlorosulfonated polyethylenes and ethylene-vinyl acetates.

26. The article of any of aspects 22 to 25, wherein the article is selected from the group consisting of textiles and leatherware, including clothing and footwear; pieces of furniture; and mattresses.

DETAILED DESCRIPTION OF THE PRESENT INVENTION

In the following the present invention will be described in more detail. The present invention relates to a polymer latex composition comprising (I) a reaction product obtained by free-radical emulsion polymerization in aqueous medium conducted at a pH of 7.5 or higher of a monomer mixture. The free-radical emulsion polymerization in aqueous medium can be conducted at a pH of at least 7.6, 7.7, 7.8, 7.9, 8.0, 8.1, 8.2, 8.3, 8.4, 8.5. Accordingly, the free-radical emulsion polymerization in aqueous medium can be conducted at a pH of no more than 13.0, 12.8, 12.6, 12.4, 12.2, 12.0, 11.8, 11.6, 11.4, 11.2, 11.0. It is to be understood that any range between any of the explicitly disclosed lower and upper limit is herein disclosed. Hence, exemplary ranges of the explicitly disclosed lower and upper ranges can be 7.7 to 13.0, 8.0 to 12.4, 8.2 to 12.0, 8.5 to 11.4. According to the present invention, the pH value of the emulsion reaction mixture can be determined as described in the examples.

The monomer mixture of the present invention comprises (a) at least one alkyl (meth)acrylate, (b) at least one ethylenically unsaturated compound comprising at least one additional functional group, the at least one additional functional group being different than the ethylenically unsaturated group; and (c) optionally at least one polyethylenically unsaturated compound. The monomer mixture of the present invention does not comprise any ethylenically unsaturated acids. Therefore, the monomer mixture of the present invention is free of polymerizable acids. Herein, the term "polymerizable acid" refers to monomers having an ethylenically unsaturated group and an acid functional group. Examples of ethylenically unsaturated acids are vinyl carboxylic acids such as (meth)acrylic acid, itaconic acid, crotonic acid, maleic acid, 3-(acryloyloxy)propanoic acid and fumaric acid.

Moreover, the reaction product (I) of the present application is obtained in the presence of (d) a surfactant system comprising anionic surfactants comprising an alkyl carboxylic acid salt. The polymer latex composition of the present invention further comprises (II) a compound which is not polymerizable by free-radical polymerization and which comprises at least 2 functional groups capable of reacting with the at least one additional functional group of (b). Preferably, the monomer mixture of the polymer latex composition of the present invention is free of butadiene and/or chloroprene.

The monomer mixture of the polymer latex composition of the present invention can comprise (a) 80 to 99.5 wt.-% of alkyl (meth)acrylates; the weight percentages being based on the total amount of monomers. Herein, the term "total amount of monomers" refers to the monomers being polymerized by free-radical emulsion polymerization. The monomer mixture of the present invention can comprise at least 81 wt.-%, 82 wt.-%, 83 wt.-%, 84 wt.-%, 85 wt.-%, 86 wt.-%, 87 wt.-%, 88 wt.-%, 89 wt.-%, 90 wt.-%, 91 wt.-%, 92 wt.-%, 93 wt.-%, 94 wt.-%, 95 wt.-% of alkyl (meth) acrylates, the weight percentages being based on the total amount of monomers. The monomer mixture of the present invention can comprise no more than 99 wt.-%, 98.5 wt.-%, 98 wt.-%, 97.5 wt.-%, 97 wt.-% of alkyl (meth)acrylates, the weight percentages being based on the total amount of monomers. It is to be understood that that any range between any of the explicitly disclosed lower and upper limit is herein disclosed. Hence, exemplary ranges of the explicitly disclosed lower and upper ranges can be 83 wt.-% to 99 wt.-%, 85 wt.-% to 98 wt.-%, 90 wt.-% to 97 wt.-%, 95 wt.-% to 99 wt.-%.

According to the present invention, the at least one alkyl (meth)acrylate (a) can be selected from the group consisting of methyl (meth)acrylate, ethyl (meth)acrylate, propyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, 2-ethylhexyl (meth)acrylate, heptyl (meth)acrylate, 2-propylheptyl (meth)acrylate, n-octyl (meth)acrylate, iso-octyl (meth) acrylate, nonyl (meth)acrylate, decyl (meth)acrylate, isodecyl (meth)acrylate, undecyl (meth)acrylate, dodecyl (meth)acrylate, tridecyl (meth)acrylate, heptadecyl (meth) acrylate, lauryl (meth)acrylate, stearyl (meth)acrylate, norbornyl (meth)acrylate, iso-bornyl (meth)acrylate, 4-t-butyl-cyclohexyl (meth)acrylate, and 3,3,5-trimethylcyclohexyl (meth)acrylate.

The monomer mixture of polymer latex composition of the present invention can comprise (b) 0.5 to 10 wt.-% of ethylenically unsaturated compounds comprising at least one additional functional group, wherein the at least one additional functional group is different than the ethylenically unsaturated group; the weight percentages being based on the total amount of monomers. The monomer mixture of the present invention can comprise at least 0.5 wt.-%, 0.6 wt.-%, 0.7 wt.-%, 0.8 wt.-%, 0.9 wt.-%, 1.0 wt.-%, 1.1 wt.-%, 1.2 wt.-%, 1.3 wt.-%, 1.4 wt.-%, 1.5 wt.-% of ethylenically unsaturated compounds comprising at least one additional functional group, wherein the at least one additional functional group is different than the ethylenically unsaturated group, the weight percentages being based on the total amount of monomers. The monomer mixture of the present invention can comprise no more than 9.5 wt.-% 9 wt.-%, 8.5 wt.-%, 8 wt.-%, 7.5 wt.-%, 7 wt.-%, 6.5 wt.-%, 6 wt.-%, 5.5 wt.-%, 5 wt.-%, 4.5 wt.-%, 4 wt.-%, 3.5 wt.-%, 3 wt.-%, 2.5 wt.-%, 2 wt.-% of ethylenically unsaturated compounds comprising at least one additional functional group, wherein the at least one additional functional group is different than the ethylenically unsaturated group, the weight percentages being based on the total amount of monomers. It will be appreciated that any range between any of the explicitly disclosed lower and upper limit is herein disclosed. Hence, exemplary ranges of the explicitly disclosed lower and upper ranges can be 0.5 wt.-% to 9 wt.-%, 0.5 wt.-% to 6 wt.-%, 0.5 wt.-% to 4 wt.-%, 0.5 wt.-% to 2 wt.-%, 0.7 wt.-% to 9 wt.-%, 1.0 wt.-% to 8 wt.-%, 1.3 wt.-% to 5.5 wt.-%, 1.5 wt.-% to 3 wt.-%.

According to the present invention, the additional functional group of (b) can be selected from hydroxyl, epoxy, ketone, aldehyde and acetoacetate groups, preferably from ketone and aldehyde groups. The at least one ethylenically unsaturated compound (b) can be selected from the group consisting of hydroxyethyl (meth)acrylate, hydroxypropyl (meth)acrylate, hydroxybutyl (meth)acrylate, hydroxyethyl caprolactone acrylate, glycidyl (meth)acrylate, acrolein, methacrolein, vinyl methyl ketone, vinyl ethyl ketone, vinyl isobutyl ketone, vinyl amyl ketone, diacetone acrylamide, and 2-[(2-methyl-1-oxo-2-propenyl)oxy]ethyl 3-oxobutanoate.

The monomer mixture of the polymer latex composition of the present invention can comprise (c) 0 to 10 wt.-% of polyethylenically unsaturated compounds; the weight percentages being based on the total amount of monomers. The monomer mixture of the present invention can comprise at least 0.1 wt.-%, 0.2 wt.-%, 0.3 wt.-%, 0.4 wt.-%, 0.5 wt.-%, 0.6 wt.-%, of polyethylenically unsaturated compounds, the weight percentages being based on the total amount of monomers. The monomer mixture of the present invention can comprise no more than 9.5 wt.-% 9 wt.-%, 8.5 wt.-%, 8 wt.-%, 7.5 wt.-%, 7 wt.-%, 6.5 wt.-%, 6 wt.-%, 5.5 wt.-%, 5 wt.-%, 4.5 wt.-%, 4 wt.-%, 3.5 wt.-%, 3 wt.-%, 2.5 wt.-%, 2 wt.-%, 1.5 wt.-%, 1.0 wt.-%, 0.9 wt.-%, 0.8 wt.-%, 0.7 wt.-% of polyethylenically unsaturated compounds, the weight percentages being based on the total amount of monomers. It will be appreciated that any range between any of the explicitly disclosed lower and upper limit is herein disclosed. Hence, exemplary ranges of the explicitly disclosed lower and upper ranges can be 0.1 wt.-% to 9 wt.-%, 0.1 wt.-% to 1.5 wt.-%, 0.1 wt.-% to 1.0 wt.-%, 0.1 wt.-% to 0.7 wt.-%, 0.3 wt.-% to 8 wt.-%, 0.5 wt.-% to 7 wt.-%, 0.7 wt.-% to 5.5 wt.-%, 1.0 wt.-% to 3 wt.-%.

The polyethylenically unsaturated compound (c) of the present invention can be selected from the group consisting of (meth)acrylic ester of polyole, allyl ester of polycarboxylic acid, allyl (meth)acrylate, and divinyl benzene. The (meth)acrylic ester of polyole can be selected from the group consisting of ethylene glycol di(meth)acrylate, di(ethylene glycol) di(meth)acrylate, tri(ethylene glycol) di(meth)acrylate, tetra(ethylene glycol) di(meth)acrylate, and poly(ethylene glycol) di(meth)acrylate. The allyl ester of polycarboxylic acid can be selected from the group consisting of diallyl phthalate, diallyl maleate, and diallyl adipate According to the present invention, the reaction mixture (I) further comprises 0.3 to 5 wt.-% of anionic surfactants comprising a carboxylic acid salt; the weight percentages being based on the total amount of monomers. The reaction mixture (I) can comprise at least 0.35 wt.-%, 0.4 wt.-%, 0.45 wt.-%, 0.5 wt.-% of anionic surfactants comprising a carboxylic acid salt, the weight percentages being based on the total amount of monomers. The monomer mixture of the present invention can comprise no more than 4.5 wt.-% 4 wt.-%, 3.5 wt.-%, 3 wt.-%, 2.5 wt.-%, 2 wt.-%, 1.5 wt.-% of anionic surfactants comprising a carboxylic acid salt, the weight percentages being based on the total amount of monomers. It will be appreciated that any range between any of the explicitly disclosed lower and upper limit is herein disclosed. Hence, exemplary ranges of the explicitly disclosed lower and upper ranges can be 0.35 wt.-% to 4.5 wt.-%, 0.4 wt.-% to 3.5 wt.-%, 0.45 wt.-% to 2.5 wt.-%, 0.5 wt.-% to 1.5 wt.-%.

The surfactant system (d) of the present invention can consist of anionic surfactants comprising an alkyl carboxylic acid salt and optionally non-ionic surfactants. The ratio of the anionic surfactants and the non-ionic surfactants if present is preferably in the range of 1:0.5 to 1:0.01, preferably 1:0.375 to 1:0.02, more preferably 1:0.2 to 1:0.03, even more preferably 1:0.15 to 1:0.05, most preferably 1:0.1 to 1:0.07. Preferably, the surfactant system (d) of the present invention consists of anionic surfactants comprising an alkyl carboxylic acid salt.

Herein, the alkyl carboxylic acid salt (d) can be selected from the group consisting of alkali metal salts, ammonium salts, and tertiary amino salts of fatty acid, rosinic acid, hydroxyalkanoic acid, epoxyalkanoic acid, cyanoalkanoic acid, diterpene carboxylic acid, and the disproportionation, partial hydrogenation and polymerization products of diterpene carboxylic acid. Preferably, the carboxylic acid salt (d) of the present invention can be selected from the group consisting of alkali metal salts, ammonium salts, and tertiary amino salts of oleates or of elaidic acid (also known as trans-oleate), stearates, myristate, palmitate, laurate, undecanate, linolate, caprylate, nonanate, caprinate, tall oil, diterpene carboxylic acid obtained from tall oil, pine resin and root resin and its disproportionation, partial hydrogenation and polymerization products. In particular, the carboxylic acid salt (d) of the present invention can be selected from the group consisting of sodium oleate, potassium oleate, ammonium oleate, sodium stearate, potassium stearate, sodium myristate, potassium myristate, sodium palmitate, potassium palmitate, potassium laurate, potassium undecanate, sodium linolate, potassium linolate, potassium caprylate, potassium nonanate, potassium caprinate, and disproportionating potassium rosinate.

Non-ionic surfactants that may be used in the present invention may be selected from the group consisting of polyethylene oxide, polyethylene oxide polypropylene oxide block copolymers, starch, gelatin, partially saponified poly(vinyl alcohol), partially saponified poly(methyl methacrylate), cellulose, methyl cellulose, hydroxymethyl cellulose, alkyl ethoxylates, fatty alcohol ethoxylates, fatty acid ethoxylates, fatty amine ethoxylates, poly(vinyl pyrrolidone), poly(vinylimidazole), and poly(vinyl pyrrolidone-co-vinyl acetate).

Herein, the polymer latex composition can comprise (II) 0.1 to 5 wt.-% of a compound which is not polymerizable by radical polymerization and which comprises at least 2 functional groups capable of reacting with the at least one additional functional group of (b), the weight percentages being based on the total amount of monomers. The polymer latex composition of the present invention can comprise at least 0.15 wt.-%, 0.2 wt.-%, 0.25 wt.-%, 0.3 wt.-%, 0.35 wt.-%, 0.4 wt.-%, 0.45 wt.-%, 0.5 wt.-% of a compound which is not polymerizable by radical polymerization and which comprises at least 2 functional groups capable of reacting with the at least one additional functional group of (b), the weight percentages being based on the total amount of monomers. The polymer latex composition of the present invention can comprise no more than 4.5 wt.-% 4 wt.-%, 3.5 wt.-%, 3 wt.-%, 2.5 wt.-%, 2 wt.-%, 1.5 wt.-%, 1 wt.-% of a compound which is not polymerizable by radical polymerization and which comprises at least 2 functional groups capable of reacting with the at least one additional functional group of (b), the weight percentages being based on the total amount of monomers. It will be appreciated that any range between any of the explicitly disclosed lower and upper limit is herein disclosed. Hence, exemplary ranges of the explicitly disclosed lower and upper ranges can be 0.15 wt.-% to 4.5 wt.-%, 0.15 wt.-% to 1.5 wt.-%, 0.3 wt.-% to 3.5 wt.-%, 0.4 wt.-% to 2 wt.-%, 0.5 wt.-% to 1.5 wt.-%.

The functional group of (II) the compound which is not polymerizable by radical polymerization and which comprises at least 2 functional groups capable of reacting with the at least one additional functional group of (b) can be selected from hydrazide, oxime ether, hydroxylamine and amine groups. Preferably, the compound which is not polymerizable by free-radical polymerization (II) can be selected from the group consisting of adipic dihydrazide, oxalic acid dihydrazide, ethylmalonic acid dihydrazide, succinic acid dihydrazide, glutaric acid dihydrazide, tartaric acid dihydrazide, pimelic acid dihydrazide, 9,10-dihydro-9,10-ethanoanthracene-11,12-dicarboxylic acid dihydrazide, valine dihydrazide, orthophthalic acid dihydrazide, isophthalic acid dihydrazide, terephthalic acid dihydrazide, sebacic acid dihydrazide, malonic acid dihydrazide, maleic acid dihydrazide, fumaric acid dihydrazide, itaconic acid dihydrazide, ethylene diamine, diethylenetriamine, triethylenetetramine, 1,2-propylene diamine, 1,3-propylene diamine, pentamethylene diamine, xylylene diamine, cyclohexane diamine and 1,6-hexanediamine.

The polymer latex composition of the present invention preferably is aqueous. Non-aqueous solvents may be employed in the aqueous polymer latex composition of the invention in small amount if desired. The amount of non-aqueous solvents may be 3 wt.-% or less, preferably 2 wt.-% or less, more preferably 1.5 wt.-% or less, most preferably 1 wt.-% or less, and in particular 0.5 wt.- or less based on the solids content of the polymer latex composition. Examples of suitable non-aqueous solvents include, but are not limited to, toluene, acetone, methylethylketone, cyclohexane, ethylene glycol dimethyl ether, ethylene glycol diethyl ether, ethylene glycol methyl ether, diethylene glycol dimethyl ether, diethylene glycol diethyl ether, diethylene glycol methyl ether, dimethylformamide, dimethyl sulfoxide, monohydric alcohols such as methanol and ethanol, and polyhydric alcohols. The polymer latex composition is preferably free of non-aqueous solvents.

Polymerization initiators useful in obtaining the reaction product (I) by free-radical emulsion polymerization are initiators that, upon exposure to heat or to electromagnetic radiation, especially with UV light, generate free-radicals, which initiate polymerization of the monomer mixture. Herein, the polymerization initiator can be selected from the group consisting of potassium persulfate, sodium persulfate, ammonium persulfate, peroxide compounds such as sodium, potassium and ammonium peroxodisulfate, peroxycarbonates and peroxyborates, benzoyl peroxide, t-butyl peroxide, and lauroyl peroxide, and azo compounds such as azobisisobutyronitrile, 2,2'-azobis(2-methyl butane nitrile, 4,4'-azobis(4-cyanovaleric acid), and 4,4'-azobis(4-cyanopentanoic acid). The peroxy compounds may in some cases advantageously be used in combination with suitable reducing agent such as sodium pyrosulphite, potassium pyrosulphite, sodium bisulphite, ascorbic acid, sodium formaldehyde sulfoxylate, Bruggolite, such as Brüggolit FF6 (commercially available from L. Brueggemann GmbH & Co. KG), and potassium bisulphite. The reaction mixture (I) of the present invention may comprise 0.02 to 6 wt.-%, preferably 0.05 to 3 wt.-%, more preferably 0.1 to 1 wt.-% of the polymerization initiator, based on the total amount of monomers.

In addition to the components described above, the polymer latex composition of the present invention may further comprise additives such as corrosion inhibitors, pigments, dyes, antioxidants, UV stabilizers, fillers, preservatives, biocides, thickeners and defoamers. These additives, if present, are used in conventional concentration and do not influence the advantages provided by the polymer latex composition of the invention.

The polymer latex composition of the present invention may have a pH in the range of 9 to 13, preferably 10 to 11.4 determined as described in the examples. The pH of the polymer latex composition can be at least 9.2, 9.4, 9.6, 9.8, 10. Accordingly, the pH of the polymer latex composition can be no more than 13.0, 12.8, 12.6, 12.4, 12.2, 12.0, 11.8, 11.6, 11.4, 11.2, 11.0. A person skilled in the art will appreciate that any range between any of the explicitly disclosed lower and upper limit is herein disclosed. Hence, exemplary ranges of the explicitly disclosed lower and upper ranges can be 7.7 to 13.0, 8.0 to 12.4, 8.2 to 12.0, 8.5 to 11.4.

The reaction product of the polymer latex composition of the present invention preferably has a glass transition temperature Tg of −10° C. or less determined by Dynamic Scanning calorimetry (DSC) as described in the examples. The reaction product can have a Tg of no more than −12° C., −15° C., −17° C., −20° C. determined by Dynamic Scanning Calorimetry (DSC) as described in the examples. The reaction product can have a Tg of at least −80° C., −75° C., −70° C., −65° C., −60° C., −55° C., −50° C., −45° C. determined by Dynamic Scanning calorimetry (DSC) as described in the examples. Any range between any of the explicitly disclosed lower and upper limit is herein disclosed. Hence, exemplary ranges of the explicitly disclosed lower and upper ranges can be −80° C. to −12° C., −65° C. to −15° C., −55° C. to −17° C., −45° C. to −20° C.

The reaction product of the present invention further can have intensity weighted mean particle diameters (z-average) in the range of 200 to 400 nm, preferably of 220 to 350 nm measured by Dynamic Light Scattering (DLS) as described in the examples.

The solid content of the polymer latex composition of the present invention is preferably in the range of 45 to 65 wt.-%. The solid content of the polymer latex composition can be at least 47 wt.-%, 50 wt.-%, 52 wt.-%, 55 wt.-%. Accordingly, the solid content of the polymer latex composition can be no more than 64 wt.-%, 63 wt.-%, 62 wt.-%, 61 wt.-%, 60 wt.-%. It will be appreciated that any range between any of the explicitly disclosed lower and upper limit is herein disclosed. Hence, exemplary ranges of the explicitly disclosed lower and upper ranges can be 47 wt.-% to 63 wt.-%, 50 wt.-% to 62 wt.-%, 53 wt.-% to 60 wt.-%.

The polymer latex composition of the present invention can exhibit a viscosity of 1000 mPas or less, preferably 800 mPas or less and more preferably 600 mPas or less determined by using a Brookfield viscometer, LVT at 60 rpm at 23° C. Spindle 2 is typically used. Depending on the viscosity of the polymer latex composition of the present invention, it may be necessary to use spindle 1 or 3 instead of spindle 2. Spindle 1 is used for viscosities in the range of 10 mPas to 90 mPas, spindle 2 is used for viscosities in the range of 50 mPas to 450 mPas, and spindle 3 is used for viscosities in the range of 200 mPas to 1800 mPas. The viscosity measurements are made only when the instrument's % torque value is between 10 and 100. The FSR (Full Scale Range) represent the maximum value that can be measured (100% on the torque scale). The minimum viscosity that can be measured is 10% of the FSR (equivalent to 10 on the torque scale). If the reading is below 10% when the viscosity is determined by a Brookfield viscometer, LVT at 60 rpm at 23° C. with a spindle 2, spindle 1 is utilized instead for the measurement. If the reading is above 100% when the viscosity is determined by a Brookfield viscometer, LVT at 60 rpm at 23° C. with a spindle 2, spindle 3 is utilized instead for the measurement.

The polymer latex composition of the present invention may be used to adhere a wide range of substrates. Suitable substrates according to the present invention can be selected from the group consisting of wood; metal; fabric; paper; leather; artificial leather; foam; thermoplastics; elastomers; concrete; rock, such as marble and granite; glass; ceramics; fiberglass; and materials used to construct high pressure laminates such as counter tops. Suitable examples of metal preferably may be selected from the group consisting of cold-rolled steel, galvanized steel and aluminum. Suitable examples of fabric preferably may be selected from the group consisting of natural textiles and synthetic textiles in woven or non-woven form. Suitable examples of foam preferably may be selected from the group consisting of polyurethane (PU) foam, polyethylene (PE) foam, latex rubber foam, and ethylene-vinyl acetate (EVA) foam. Suitable examples of thermoplastics preferably may be selected from the group consisting of acrylic polymers, polylactic acids, polyamides, polybenzimidazoles, polycarbonates, polyether sulfones, polyoxymethylenes, polyetherether ketones, polyetherimides, polyethylenes, polyphenylene oxides, polyphenylene sulfides, polypropylenes, polystyrenes, polyvinyl chlorides, polytetrafluoroethylenes, and acrylonitrile butadiene styrene. Suitable examples of elastomers preferably may be selected from the group consisting of polyisoprenes, polybutadienes, butyl rubber, styrene-butadiene rubbers, nitrile rubbers, ethylene propylene rubbers, ethylene propylene diene rubbers, epichlorohydrin rubbers, polyacrylic rubbers, silicone rubbers, fluorosilicone rubbers, polyether block amides, chlorosulfonated polyethylenes and ethylene-vinyl acetates.

Certain applications require that soon after applying the adhesive emulsion to one, or both, of the substrates to be contacted and pressing the coated substrates together an adhesive bond is quickly formed at room temperature (20° C.). The adhesive bond should provide sufficient handling strength which holds the substrates together and resist subsequent forces on the fresh glueline. The polymer latex composition of the present application may be applied to substrates in a variety of ways known to those skilled in the art including, for example, spraying, brushing, wiping, coating, and mechanical printing methods such as gravure and curtain coating.

Accordingly, the present invention also relates to an article comprising at least two substrates adhered together with the polymer latex composition of the present invention. Herein, the substrates adhered together can be the same or different from each other. It is noted that suitable substrates according to the present invention are as described above. Preferably, the substrates of the present invention can be selected from the group consisting of wood, metal, leather, artificial leather, foam, thermoplastic, and elastomer.

According to the present invention, the article preferably comprises foam and foam adhered together, foam and metal adhered together, foam and wood adhered together, foam and elastomer adhered together, foam and thermoplastic adhered together, foam and leather adhered together, foam and artificial leather adhered together, leather and thermoplastic adhered together, leather and elastomer adhered together, artificial leather and thermoplastic adhered together, artificial leather and elastomer adhered together, leather and leather adhered together, leather and artificial leather adhered together, or artificial leather and artificial leather adhered together.

Herein, the article preferably may be selected from the group consisting of textiles and leatherware, including clothing and footwear; pieces of furniture; and mattresses.

The present invention further refers to a method to coagulate the polymer latex composition of the present invention as described above. According to the present invention, the polymer latex composition is coagulated by applying shear forces, preferably by spraying the polymer latex composition of the present invention. Herein, the polymer latex composition already coagulates when applying shear rates of at least 60 s$^{-1}$ as determined by a Haake Rheostress 600 at a temperature of 20° C. For the measurement, a measuring cup (HS) is filled up to the marking with the polymer latex composition of the present invention and a cylinder (HS25) is automatically adjusted by the system providing a distance of 8 mm between the bottom of the cup and the cylinder. The gap between the cylinder and the cup is 25 µm. The measurement is performed by increasing the shear rate 33 s$^{-1}$ per minute within 30 min. The stop criteria of the measurement is a shear stress of greater than 10,000 Pa. Accordingly, the polymer latex composition of the present invention preferably is coagulated by applying shear rates in the range of 60 s$^{-1}$ to 10.000 s$^{-1}$, more preferably 60 s$^{-1}$ to 8.000 s$^{-1}$, most preferably 60 s$^{-1}$ to 6.000 s$^{-1}$ as determined by a Haake Rheostress 600 at a temperature of 20° C.

The polymer latex composition can be sprayed on a substrate. Suitable substrates according to the present invention are as described above. The coagulation preferably takes place at room temperature (20° C.). The polymer latex composition is preferably sprayed from a single container as a one-part (1-K) adhesive. The pressure applied for spraying may preferably be in the range of from 30 KPa to 150 KPa. The polymer latex composition according to the present invention may be sprayed using a spray gun, such as for example with the spray gun "Walther Pilot III 2K" and pressure vessels "Walther MDC".

The coagulation of the polymer latex composition of the present invention may also be obtained by contacting the polymer latex composition with an electrolytic aqueous solution as a two-component (2-K) adhesive. Contact with the electrolytic aqueous solution may be conducted by adding the electrolyte aqueous solution to the polymer latex composition while stirring. Furthermore, contact with the electrolytic aqueous solution is preferably conducted by co-spraying the electrolyte aqueous solution and the polymer latex composition of the present invention from two separate containers on a substrate.

The electrolyte aqueous solution which can be used in the present invention is an aqueous solution of organic acid (salt) or inorganic acid (salt) having the properties of being able to coagulate the polymer latex. The concentration of the electrolyte aqueous solution, which can be used in the present invention is preferably at least 0.1 wt.-%, more preferably at least 1.0 wt.-%, most preferably at least 2.0 wt.-%. Examples of electrolyte aqueous solution are aqueous solutions of inorganic salts such as sodium chloride, potassium chloride, lithium chloride, sodium bromide, potassium bromide, lithium bromide, potassium iodide, sodium iodide, potassium sulfate, sodium sulfate, ammonium sulfate, ammonium chloride, sodium nitrate, potassium nitrate, calcium chloride, ferrous sulfate, magnesium sulfate, zinc sulfate, copper sulfate, barium chloride, ferrous chloride, ferric chloride, magnesium chloride, ferric sulfate, aluminum sulfate, potassium alum and iron alum, aqueous solutions of inorganic acids such as hydrochloric acid, sulfuric acid, nitric acid and phosphoric acid, organic acids such as acetic acid, citric acid and formic acid and aqueous solutions thereof and aqueous solutions of organic salts such as sodium acetate, calcium acetate, sodium formate and calcium formate. It is noted that coagulation is preferably achieved by applying shear forces without the use of a coagulant. In effect the coagulation, unlike the prior art is via physical forces rather than using chemical additives which mitigates against using chemicals that can impact on the environment.

Accordingly, the present invention also relates to a one-part (1-K) aqueous contact adhesive comprising the polymer latex composition of the present invention as described above.

Furthermore, the present invention relates to a method for the preparation of the polymer latex composition of the present invention as described above. According to the invention, the method comprises that (I) a monomer mixture is polymerized by free-radical emulsion polymerization in aqueous medium at a pH of 7.5 or higher in the presence of (d) a surfactant system comprising anionic surfactants comprising an alkyl carboxylic acid salt. The pH of the aqueous medium can be at least 7.6, 7.7, 7.8, 7.9, 8.0, 8.1, 8.2, 8.3, 8.4, 8.5. Accordingly, the pH of the aqueous medium can be no more than 13.0, 12.8, 12.6, 12.4, 12.2, 12.0, 11.8, 11.6, 11.4, 11.2, 11.0. It will be appreciated that any range between any of the explicitly disclosed lower and upper limit is herein disclosed. Hence, exemplary ranges of the explicitly disclosed lower and upper ranges can be 7.7 to 13.0, 8.0 to 12.4, 8.2 to 12.0, 8.5 to 11.4. According to the present invention, the pH value of the emulsion reaction mixture can be determined as described in the examples.

The monomer mixture of the present invention comprises (a) at least one alkyl (meth)acrylate, (b) at least one ethylenically unsaturated compound comprising at least one additional functional group, the at least one additional functional group being different than the ethylenically unsaturated group; and (c) optionally at least one polyethylenically unsaturated compound. The monomer mixture of the present invention does not comprise any ethylenically unsaturated acids. The method for preparing the polymer latex composition of the present invention further comprises (II) the addition of a compound which is not polymerizable by free-radical polymerization and which comprises at least 2 functional groups capable of reacting with the at least one additional functional group of (b) to the polymer latex composition before or after the free-radical emulsion polymerization. Preferably, the monomer mixture of the present invention is free of butadiene and/or chloroprene.

It is appreciated that suitable (a) alkyl (meth)acrylates, (b) ethylenically unsaturated compounds comprising at least one additional functional group, the at least one additional functional group being different than the ethylenically unsaturated group, (c) polyethylenically unsaturated compounds, (d) surfactant systems comprising anionic surfactants comprising an alkyl carboxylic acid salt, (II) compounds which are not polymerizable by free-radical polymerization and which comprise at least 2 functional groups capable of reacting with the at least one additional functional group of (b), as well as their suitable weight ranges (wt.-%) can be selected as described above.

The free-radical polymerization is preferably conducted at 50° C. or higher, preferably 70° C. or higher. Suitable polymerization times are preferably in the range of 1 to 12 h, and more preferably 2 to 6 h.

Generally, the monomer mixture is dispersed in water with the surfactant system (d). The polymerization may be initiated by a polymerization initiator as described above. The emulsion polymerization may be a batch process in which the entire dispersion of the monomer mixture, surfactant system (d) and water is put in the reactor. It may be an incremental process in which a portion of the monomer mixture with the surfactant system (d) and water is added to the reactor and the polymerization is initiated or it may be a continuous reaction using a chain of two or more reactors. The remaining portion of the monomer mixture with the surfactant (d), if any, may be added to the reactor over a period of time. According to the present invention, the process may preferably be a seeded process in which small amounts of a seed polymer are added to the reactor prior to initiation to control the particle size. It will be appreciated that the compound which is not polymerizable by free-radical polymerization and which comprises at least 2 functional groups capable of reacting with the at least one additional functional group of (b) can be added to the reactor before or after polymerization.

The seed suitable according to the invention may consist of, for example, latices based on the latices to be produced according to the present invention. Furthermore, standard styrene butadiene seed, polystyrene seed or (meth)acrylate seed can be used according to the present invention. Herein, the seed may be formed in situ at the beginning of the polymerization reaction. The particle size of the initially introduced seed is preferably in the range from 20 to 50 nm, more preferably in the range from 25 to 35 nm. The quantity of the seed to be used depends on the size of the latex to be produced and can be 0.01 to 5 wt.-%, preferably 0.1 to 2 wt.-%, based on the total amounts of monomers.

Having generally described the present invention, a further understanding can be obtained by reference to certain specific examples which are provided herein for purposes of illustration only, and are not intended to be limiting unless otherwise specified.

EXAMPLES

Materials

The following abbreviations will also be adhered to in the Examples:

BA Butyl acrylate
MMA Methyl methacrylate
2-EHA 2-ethyl hexyl acrylate
IBOA Isobornyl acrylate
DAAM Diacetone acrylamide
HEMA Hydroxyethyl methacrylate
ADH Adipic acid dihydrazide
$NH_4$-oleate Ammonium oleate
K-oleate Potassium oleate MAA Methacrylic acid
TBHP tert-butyl hydroperoxide
SFS Sodium formaldehyde sulfoxylate
Acrylate seed Butyl acrylate-methyl methacrylate copolymer seed (30 wt.-% in water, intensity weighted mean particle diameter of 32 nm, determined by DLS)
Foam cubes Polyurethane foam Test Methods Determination of Total Solid Contents (TSC):

The determination of total solids content is based on a gravimetric method. 1-2 g of the dispersion are weighed on an analysis balance into a tarred aluminum dish. The dish is stored for 1 hour at 120° C. in a circulating air oven until constant mass is reached. After cooling to room temperature (23° C.) the final weight is determined again. The solids content is calculated as follows:

$$TSC = \frac{m_{initial} - m_{final}}{m_{initial}} \cdot 100\%$$

wherein $m_{initial}$=initial weight, $m_{final}$=weight after drying.

pH

The pH of the aqueous medium of the free-radical emulsion polymerization and of the polymer latex composition of the present invention was measured using a Schott CG840 pH Meter. After a two point calibration with buffer at pH 4 and pH 7, the electrode was immersed in the dispersion at 23° C. The constant value on the display was recorded as pH value.

Particle Size

Particle size was measured using a Zetasizer Nano S Dynamic Light Scattering (DLS) instrument (available from Malvern Instruments, Incorporated, Westborough, MA). Four drops of the reaction product obtained by free radical emulsion polymerization was diluted with about 200 mL of deionized water. A portion was transferred in a polystyrene cuvette. The intensity weighted mean particle size (z-average) as provided by the instrument software was recorded.

Glass Transition Temperature (Tg)

The actual glass transition temperature (Tg) of the latex particles was determined by Differential Scanning calorimetry (DSC) with a Perkin Elmer DSC 4000 using the procedure according to ASTM 3418-08. The glass transition temperature was determined by measuring the midpoint temperature $T_{mg}$ at a heating rate of 20° C./min. The temperature range of the measurement was from −100° C. to 180° C.

Viscosity

The viscosities were determined at 23° C. with a Brookfield LVT viscometer using spindle 2. Approximately 350 ml of the liquid (freed of air bubbles) was filled into a beaker and the spindle of the viscometer was immersed up to the mark. The viscometer is then switched on and after approximately 1 minute the value is recorded until it is constant. The instrument's % torque value was between 10 and 100. The viscosity was measured at 60 rpm.

Sprayability

For the 1-K application, the polymer latex composition Ex-1, CE-1 to CE-3 were sprayed using the spray gun "Walter Pilot III 2K" and a pressure vessel "Walther MDG 2". The latex composition was filled into the pressure vessel and the pressure of the vessel was set to approximately 100 kPa.

For the 2-K application, an aqueous CaCl$_2$-solution (10 wt.-% in water) was additionally used. The aqueous CaCl$_2$-solution (10 wt.-%) was filled in a pressure vessel "Walther MDG 1" and the pressure of the vessel was set to approximately 50 kPa.

Any clogging or blocking at the spray nozzle was noted and subjective assessment regarding sprayability was made.

Adhesion Strength Measurement

The adhesion strength refers to forming a foam to foam bond after application of an adhesive composition. Samples of foam cut into 30×30×30 mm cubes were used as a substrate. The top face of two cubes was sprayed with 45 to 180 mg of a polymer latex composition at room temperature. The sprayed face of the first cube was placed on the sprayed face of the second cube and a weight of 0.9 kg was placed on top of the cube pair. After 10 sec the weight was removed of the glued pair of cubes and a wire was fixed in the first cube of the glued pair of cubes. To determine the adhesion strength, the wire fixed in the first cube was drawn with a spring balance, while the second cube of the glued cube pair was fixed. The maximum force was measured with the spring balance until the first cube was separated from the second cube on the sprayed surfaces of the glued cube pair. The samples were measured after a defined time of loading of 0.9 kg. The maximum force was measured immediately (after 10 sec), after 5 min, 10 min, 30 min, 60 min and 24 h. The cubes were weighted before and after applying the polymer latex composition to determine the amount of polymer latex composition used.

All amounts reported in the examples below are given in parts by weight unless otherwise is specified Preparation of Polymer Latex Composition Example 1 (Ex-1)

A mixture of 201 parts of deionized water and 7.71 parts of an acrylate seed was stirred and heated in a 2 L glass reactor equipped with a reflux condenser, mechanical stirrer, temperature probe and metering pump. When the temperature of the mixture reached 77° C., 2.3 parts ammonia (aqueous solution with 25 wt.-% ammonia) and an initiator solution of 1.73 parts sodium persulfate in 15.53 parts of deionized water was added in a single shot to the reactor. After mixing for five minutes an initiator solution containing 1.73 parts of ammonia persulfate in 32.78 parts of deionized water and a pre-emulsion containing 1028.1 parts BA, 104.7 parts MMA, 11.5 parts HEMA, 57.5 parts DAAM, 10.35 parts of ammonia oleate, 0.57 parts potassium phosphate and 383.5 parts of deionized water were fed into the reactor over a period of 270 min. In the first 30 min of the feeds the temperature was continuously increased to 80° C. 0.2 parts of ammonia (aqueous solution with 25 wt.-% ammonia) were added in four single shots after 60 min, 180 min, 245 min and 345 min, after starting the feeds. After completion of the pre-emulsion addition step, the reaction mixture was agitated and maintained at 80° C. for 60 min. The mixture was cooled down to room temperature. Meanwhile a solution of 0.88 part of SFS in 7.99 parts deionized water was fed in 60 min to the reaction mixture. 1.25 parts of TBHP (70 wt.-% in water) were added in one shot at the beginning of the SFS feed. After completion, the dispersion was filtered through a 100 μm mesh and the pH was adjusted with ammonia to 10. Afterwards a solution of 2.88 parts of ADH in 25.88 parts of water was added to the dispersion.

The dispersion was characterized by determine the solid content, viscosity, particle size and glass transition.

Comparative Example 1 (CE-1)

A mixture of 201.5 parts of deionized water and 7.5 parts of an acrylate seed was stirred and heated in a 2 L glass reactor equipped with a reflux condenser, mechanical stirrer, temperature probe and metering pump. When the temperature of the mixture reached 77° C., 2.24 parts ammonia (aqueous solution with 25 wt.-% ammonia) and an initiator solution of 1.68 parts sodium persulfate in 15.12 parts of deionized water was added in a single shot to the reactor. After mixing for five minutes an initiator solution containing 1.73 parts of ammonia persulfate in 32.78 parts of deionized water and a pre-emulsion containing 1006.9 parts BA, 101.9 parts MMA, 11.2 parts HEMA, 4.48 parts of potassium oleate, 0.56 parts potassium phosphate and 418.5 parts of deionized water were fed into the reactor over a period of 270 min. In the first 30 min of the feeds the temperature was continuously increased to 80° C. 0.2 parts of ammonia (aqueous solution with 25 wt.-% ammonia) were added in four single shots after 60 min, 180 min, 245 min and 345 min, after starting the feeds. After completion of the pre-emulsion addition step, the reaction mixture was agitated and maintained at 80° C. for 60 minutes. The mixture was cooled down to room temperature. Meanwhile a solution of 0.39 part of SFS in 7.45 parts deionized water was fed in 60 min to the reaction mixture. 0.74 parts of TBHP (70 wt.-% in water) were added in one shot at the beginning of the SFS feed. After completion, the dispersion was filtered through a 100 μm mesh and the pH was adjusted with ammonia to 10.

The dispersion was characterized by determine the solid content, viscosity, particle size and glass transition.

Comparative Example 2 (CE-2)

A mixture of 197.9 parts of deionized water and 7.37 parts of an acrylate seed was stirred and heated in a 2 L glass reactor equipped with a reflux condenser, mechanical stirrer, temperature probe and metering pump. When the temperature of the mixture reached 77° C., 2.2 parts ammonia (aqueous solution with 25 wt.-% ammonia) and an initiator solution of 1.65 parts sodium persulfate in 14.85 parts of deionized water was added in a single shot to the reactor. After mixing for five minutes an initiator solution containing 1.65 parts of ammonia persulfate in 31.35 parts of deionized water and a pre-emulsion containing 1071.4 parts BA, 17.61 parts MMA, 11 parts HEMA, 9.9 parts of ammonia oleate, 0.55 parts potassium phosphate and 412.8 parts of deionized water were fed into the reactor over a period of 270 min. In the first 30 min of the feeds the temperature was continuously increased to 80° C. 0.2 parts of ammonia (aqueous solution with 25 wt.-% ammonia) were added in four single shots after 60 min, 180 min, 245 min and 345 min, after starting the feeds. After completion of the pre-emulsion addition step, the reaction mixture was agitated and maintained at 80° C. for 60 min. The mixture was cooled down to room temperature. Meanwhile a solution of 1.1 part of D-isoascorbic acid in 9.9 parts deionized water was fed in 60 min to the reaction mixture. 0.47 parts of TBHP (70 wt.-% in water) were added in one shot at the beginning of the D-isoascorbic acid feed and the same amount was added in one shot after 30 min of the D-isoascorbic acid feed. After completion the dispersion was filtered through a 100 μm mesh and the pH was adjusted with ammonia to 10.

The dispersion was characterized by determine the solid content, viscosity, particle size and glass transition.

Comparative Example 3 (CE-3)

A mixture of 19.46 parts of deionized water, 0.08 pats of sodium dodecylbenzene sulfonate, 0.04 parts of sodium hydrogen carbonate buffer, 2.37 parts 2-EHA, and 1.63 parts of IBOA was stirred and heated under nitrogen in a 5-neck reactor flask equipped with a reflux condenser, temperature probe, mechanical stirrer, metering pump, and feeding funnel. When the temperature of the mixture reached 74° C., an initiator solution of 0.04 parts of ammonium persulfate in 0.34 parts of deionized water was added in a single shot to the flask. The reaction was kept at 78° C. for 30 min to provide the seed emulsion. Next, an initiator solution containing 0.09 parts potassium persulfate and 0.69 parts deionized water was added in one shot. After mixing for two minutes, a pre-emulsion containing 21.73 parts deionized water, 0.40 parts sodium dodecylbenzene sulfonate, 11.64 parts 2-EHA, 4.34 parts BA, and 14.01 parts styrene was fed in the reactor via a precision pump over a period of 140 min. After completion of this addition step, the reactants were heated for 20 min at 78° C. Next, an initiator solution containing 0.03 parts potassium persulfate, and 0.57 parts deionized water was added in one shot. After mixing for two minutes, two additional feedings were simultaneously dripped into the reactor flask over a period of 70 min. One feeding was an aqueous solution including 4.04 parts deionized water and 0.38 parts DAAM, the other feeding was a monomer mixture containing 12.35 parts BA, 0.75 parts MAA, and 4.38 parts MMA. After these additions were complete, the reaction mixture was agitated and maintained at 78° C. for 45 min. The resulting emulsion was cooled to 25° C. and filtered through a 100 μm mesh.

Then 0.9 parts by weight of a 10 wt.-% aqueous solution of ADH was added to 50 parts by weight of the acrylic dispersion.

TABLE 1

| Ingredients | Ex-1 | CE-1 | CE-2 | CE-3 |
|---|---|---|---|---|
| BA | 89.4 wt.-% | 89.9 wt.-% | 97.4 wt.-% | 32 wt.-% |
| MMA | 9.1 wt.-% | 9.1 wt.-% | 1.6 wt.-% | 9 wt.-% |
| 2-EHA | — | — | — | 27 wt.-% |
| IBOA | — | — | — | 3 wt.-% |
| DAAM | 0.5 wt.-% | — | — | 0.7 wt.-% |
| HEMA | 1.0 wt.-% | 1.0 wt.-% | 1.0 wt.-% | — |
| ADH | 0.25 wt.-% | — | — | 0.2 wt-% |
| MAA | — | — | — | 1.5 wt.-% |
| Styrene | — | — | — | 27 wt.-% |
| Solids (wt.-%) | 54.8 | 55.2 | 55.1 | 50.3 |
| pH | 10.2 | 10.2 | 10.2 | 3.5 |
| Tg (° C.) | −32 | −34 | −42 | — |
| Viscosity LVT, 60 rpm (mPas) | 190 Spindle 2 | 105 spindle 2 | 145 spindle 2 | 172 Spindle 2 |
| Particle size (nm) | 317 | 269 | 257 | 138 |

1-K and 2-K Application

For the 1-K application, the polymer latex composition Ex-1, CE-1 to CE-3 were sprayed using the spray gun "Walther Pilot III 2K" and a pressure vessel "Walther MDG 2". The latex composition was filled into the pressure vessel and the pressure of the vessel was set to approximately 100 kPa.

For the 2-K application, an aqueous $CaCl_2$-solution (10 wt.-% in water) was additionally used. The $CaCl_2$-solution was filled in a pressure vessel "Walther MDG 1" and the pressure of the vessel was set to approximately 50 kPa. The polymer latex composition and $CaCl_2$-solution were sprayed simultaneously by using a "Walther pilot III 2K".

TABLE 2

| | | Test | | | |
|---|---|---|---|---|---|
| Sprayability | | Ex-1 No spray gun nozzle blocking | CE-1 No spray gun nozzle blocking | CE-2 No spray gun nozzle blocking | CE-3 No spray gun nozzle blocking |
| force (N) 10 sec | 1-K | 10 | 12 | 6 | 0 |
| | 2-K | 28 | 22 | 25 | 10 |
| force (N) 5 min | 1-K | 14 | 16 | 9 | 0 |
| | 2-K | 32 | 30 | 27 | 15 |
| force (N) 10 min | 1-K | 23 | 18 | 10 | 0 |
| | 2-K | 41 | 36 | 27 | 20 |
| force (N) 30 min | 1-K | >45 | 28 | 13 | 0 |
| | 2-K | >45 | >45 | 34 | 32 |
| force (N) 60 min | 1-K | >45 | 34 | 30 | 20 |
| | 2-K | >45 | >45 | 43 | >45 |
| force (N) 24 h | 1-K | >45 | 40 | 40 | >45 |
| | 2-K | >45 | >45 | >45 | >45 |
| Amount adhesive (in g/m²) | 1-K | 68 | 127 | 136 | 128 |
| | 2-K | 80 | 118 | 180 | 59 |

It is to be noted that although the invention discusses individual embodiments the invention is intended to cover combinations of the embodiments discussed.

The invention claimed is:

1. A polymer latex composition comprising:
   (I) the reaction product obtained by free-radical emulsion polymerization in aqueous medium conducted at a pH of 7.5 or higher of a monomer mixture comprising:
   (a) at least one alkyl (meth)acrylate,
   (b) at least one ethylenically unsaturated compound comprising at least one additional functional group, the at least one additional functional group being different than the ethylenically unsaturated group; and
   (c) optionally at least one polyethylenically unsaturated compound;
   wherein the monomer mixture does not comprise any ethylenically unsaturated acids; and
   in the presence of
   (d) a surfactant system comprising anionic surfactants comprising an alkyl carboxylic acid salt,
   (II) a compound which is not polymerizable by free-radical polymerization and which comprises at least two functional groups capable of reacting with the at least one additional functional group of (b), wherein the at least two functional groups are selected from hydrazide, oxime ether, hydroxylamine and amine groups.

2. The polymer latex composition of claim 1, wherein the monomer mixture comprises:
   (a) 80 to 99.5 wt.-% of alkyl (meth)acrylates;
   (b) 0.5 to 10 wt.-% of ethylenically unsaturated compounds comprising at least one additional functional group, wherein the at least one additional functional group is different than the ethylenically unsaturated group; and
   (c) 0 to 10 wt.-% of polyethylenically unsaturated compounds;
   the weight percentages being based on the total amount of monomers.

3. The polymer latex composition of claim 1, wherein the reaction mixture (I) comprises:
   0.3 to 5 wt.-% of anionic surfactants comprising a carboxylic acid salt, the weight percentages being based on the total amount of monomers.

4. The polymer latex composition of claim 1, wherein the surfactant system (d) consists of anionic surfactants comprising an alkyl carboxylic acid salt and optionally non-ionic surfactants, whereby the ratio of the anionic surfactants and the non-ionic surfactants if present is in the range of 1:0.5 to 1:0.01.

5. The polymer latex composition of claim 1, wherein the polymer latex composition comprises:
   (II) 0.1 to 5 wt.-% of a compound which is not polymerizable by radical polymerization and which comprises at least 2 functional groups capable of reacting with the at least one additional functional group of (b), the weight percentages being based on the total amount of monomers.

6. The polymer latex composition of claim 1, wherein the pH of the polymer latex composition is in the range of 9 to 13.

7. The polymer latex composition of claim 1, wherein the alkyl carboxylic acid salt (d) is selected from the group consisting of alkali metal salts, ammonium salts, and tertiary amino salts of fatty acid, rosinic acid, hydroxyalkanoic acid, epoxyalkanoic acid, cyanoalkanoic acid, diterpene carboxylic acid, and the disproportionation, partial hydrogenation and polymerization products of diterpene carboxylic acid.

8. The polymer latex composition of claim 1, wherein the reaction product has a glass transition temperature Tg of −10° ° C. or less determined by Dynamic Scanning calorimetry (DSC).

9. The polymer latex composition of claim 1, wherein the solid content of the polymer latex composition is in the range of 45 to 65 wt.-%.

10. A one-part aqueous contact adhesive comprising the polymer latex composition of claim 1.

11. A method to coagulate the polymer latex composition of claim 1 by applying shear forces.

12. A method to prepare a polymer latex composition, wherein
   (I) a monomer mixture comprising:
   (a) at least one alkyl (meth)acrylate,
   (b) at least one ethylenically unsaturated compound comprising at least one additional functional group, the at least one additional functional group being different than the ethylenically unsaturated group; and
   (c) optionally at least one polyethylenically unsaturated compound, wherein the monomer mixture does not comprise any ethylenically unsaturated acids and is polymerized by free-radical emulsion polymerization in aqueous medium at a pH of 7.5 or higher in the presence of
   (d) a surfactant system comprising anionic surfactants comprising an alkyl carboxylic acid salt,
   (II) a compound which is not polymerizable by free-radical polymerization and which comprises at least two functional groups capable of reacting with the at least one additional functional group of (b) is added to the polymer latex composition before or after the free-radical emulsion polymerization, wherein the at least two functional groups are selected from hydrazide, oxime ether, hydroxylamine and amine groups.

13. The method of claim 12, wherein (d) is defined as in claim 7.

14. An article comprising at least two substrates adhered together with the polymer latex composition of claim 1.

15. The article of claim 14, wherein the article is selected from the group consisting of textiles and leatherware, including clothing and footwear; pieces of furniture; and mattresses.

\* \* \* \* \*